United States Patent [19]
Thompson

[11] Patent Number: 5,769,439
[45] Date of Patent: Jun. 23, 1998

[54] UNIVERSAL RUNNING BOARD ACCESSORY, PREFERABLY WITH FENDER ATTACHMENT

[75] Inventor: Scott P. Thompson, Des Moines, Iowa

[73] Assignee: DFM Corporaiton, Indianola, Iowa

[21] Appl. No.: 651,962

[22] Filed: May 21, 1996

[51] Int. Cl.[6] ..................................................... B60R 3/00
[52] U.S. Cl. ........................................................... 280/163
[58] Field of Search .................................. 280/163, 169, 280/154, 848; 296/151, 203, 204; D12/203

[56] References Cited

U.S. PATENT DOCUMENTS

| | | | |
|---|---|---|---|
| D. 342,476 | 12/1993 | Beckett | D12/203 |
| 4,836,568 | 6/1989 | Preslik | 280/163 |
| 5,137,293 | 8/1992 | Graves | 280/163 |
| 5,193,829 | 3/1993 | Holloway | 280/163 |
| 5,238,268 | 8/1993 | Logan | 280/848 |
| 5,340,154 | 8/1994 | Scott | 280/848 |
| 5,501,475 | 3/1996 | Bundy | 280/163 |

*Primary Examiner*—Robert J. Oberleitner
*Assistant Examiner*—C. T. Bartz
*Attorney, Agent, or Firm*—Zarley, McKee, Thomte, Voorhees, & Sease

[57] ABSTRACT

Universal running board that is substantially symmetrical such that it can be mounted to either the driver side or passenger side of a vehicle. The running board assembly includes a mounting device that provides for continuous linear adjustment of the running board. A fender flare is countered so to nest with the running board and provide an integral form.

15 Claims, 7 Drawing Sheets

UNIVERSAL RUNNING BOARD ACCESSORY, PREFERABLY WITH FENDER ATTACHMENT

BACKGROUND OF THE INVENTION

This invention relates to accessories attachable to a vehicle and, in particular, it relates to a running board preferably attached to a fender flare.

Manufactures and users add running boards and fender flares to vehicles for both esthetic appeal and functionality. Running boards and fender flares give a vehicle a "custom" look. They are also functional, however. A running board provides a support surface to allow drivers and passengers to easily enter and exit a vehicle, while a fender flare protects the fender surface from materials such as gravel, mud and debris propelled by the tires of the vehicle.

Running boards are presently designed for use with either the driver side or passenger side of a vehicle, but not both. That is, prior art running boards are customized for use on only one side of a vehicle and are not easily adapted for use on the other. Thus, there is a need in the art for a running board that can easily mount to either the driver side or passenger side of the vehicle.

Because vehicles have many different types of body styles, mounting a running board to a specific vehicle is often problematic. The running boards and mounting devices presently used can be attached to a vehicle in only a finite number of positions. Many of the attachment devices include a plurality of slots and holes for adjustably mounting the running board to the vehicle body. With such a mounting device, however, there are inevitably "dead spaces" or gaps limiting the adjustment of the running board. For this reason, many different styles of running boards are required for attachment to the myriad of different body styles. Therefore, there is a need in the art for a running board that can be continuously adjusted over a range of positions to eliminate the need for multiple running board and assembly designs.

Because of the inherent limitations in body styles, there are often only a few places along the vehicle body for attaching a running board. The prior art solution is to provide multiple styles of running boards and attachments so that an appropriate running board can be selected for a given body style. Instead, it would be desirable to have a running board that can be adjustably mounted over a range of positions independent of the location of the mounting device. In other words, there is a need in the art for a mounting member attachable anywhere along the running board so to be easily adaptable to a variety of vehicle body styles.

Fender flares are generally known in the art. Fender flares are most often of one-piece construction being molded or formed of a durable material such as plastic. Although the flares are configured to blend with the contour of the fender surface surrounding the wheel well, they are not easily adapted for use with a running board. Prior art fenders rely upon glue, screws, rivets, or similar attachment means for securing the running board to the fender flare. This is undesirable for several reasons. Such attachment means are unsightly and detract from the esthetic quality of the accessories. Also, it is often difficult to easily and quickly locate the appropriate attachment position for the fender flare and running board. In addition, this prior art design does not give the appearance that the fender flare and running board are integrally formed, but instead the combination appears as two distinct pieces. For these reasons, there is also a need in the art for a running board and fender flare combination that allows the installer to easily locate the attachment point and also gives the appearance of an integrally formed accessory.

It is therefore the primary objective of the present invention to provide a running board and fender flare that improve upon or solve the problems and deficiencies existing in the art.

Another objective of the present invention is to provide a running board and fender flare that are easily attachable to each other and adaptable for mounting to a variety of different vehicle body styles.

A further objective of the present invention is to provide a running board that can be mounted on either the driver side or passenger side of a vehicle.

Another objective of the present invention is to provide a running board assembly that is easily adjustable for mounting to different locations along the vehicle body.

A further objective of the present invention is to provide a running board assembly that is capable of providing continuous linear adjustment.

A still further objective of the present invention is to provide a fender flare and running board that easily locate and nest together and appear integrally formed.

Another objective of the present invention is to provide a fender flare and running board which are efficient in operation, economical to manufacture, and durable in use.

SUMMARY OF THE INVENTION

The foregoing objectives are achieved in a preferred embodiment of the invention by a universal elongated running board that is substantially symmetrical about its mid-point. As such, the running board is easily attachable to either the driver side or passenger side of a vehicle.

In its preferred embodiment, the running board is used with a fender flare. The running board and fender flare are contoured such that the accessories easily locate together in a nesting position and appear integrally formed.

In its preferred form, the invention uses a mounting device to attach the fender flare to the vehicle body. The mounting device has a plurality of slots spaced and aligned so to provide for attachment of the running board over a range of positions and for continuous linear adjustment along a substantially horizontal axis. A reinforcement member is also used in the preferred embodiment to enable the running board to be attached at any point along its entire length.

DETAILED DESCRIPTION OF THE PREFERRED EMBODIMENT

Figure 1:
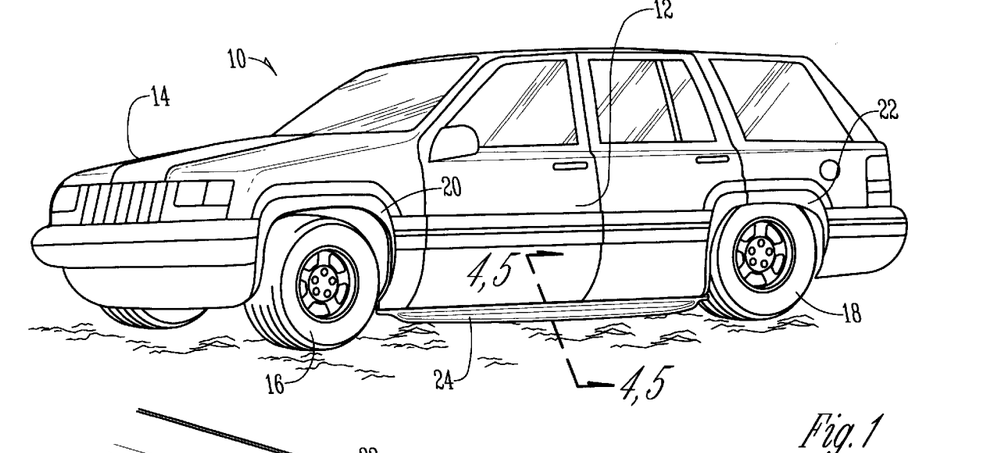
FIG. 1 is a perspective view of a preferred embodiment of the running board mounted on a vehicle.

FIG. 1 shows a vehicle 10 having a driver side 12, a passenger side 14, forward wheels 16 and rearward wheels 18. Fenders 20 and 22 partially surround the forward and rearward wheels 16 and 18 respectively. Running boards 24 are mounted towards the bottom of the driver side 12 and passenger side 14.

Figure 2:
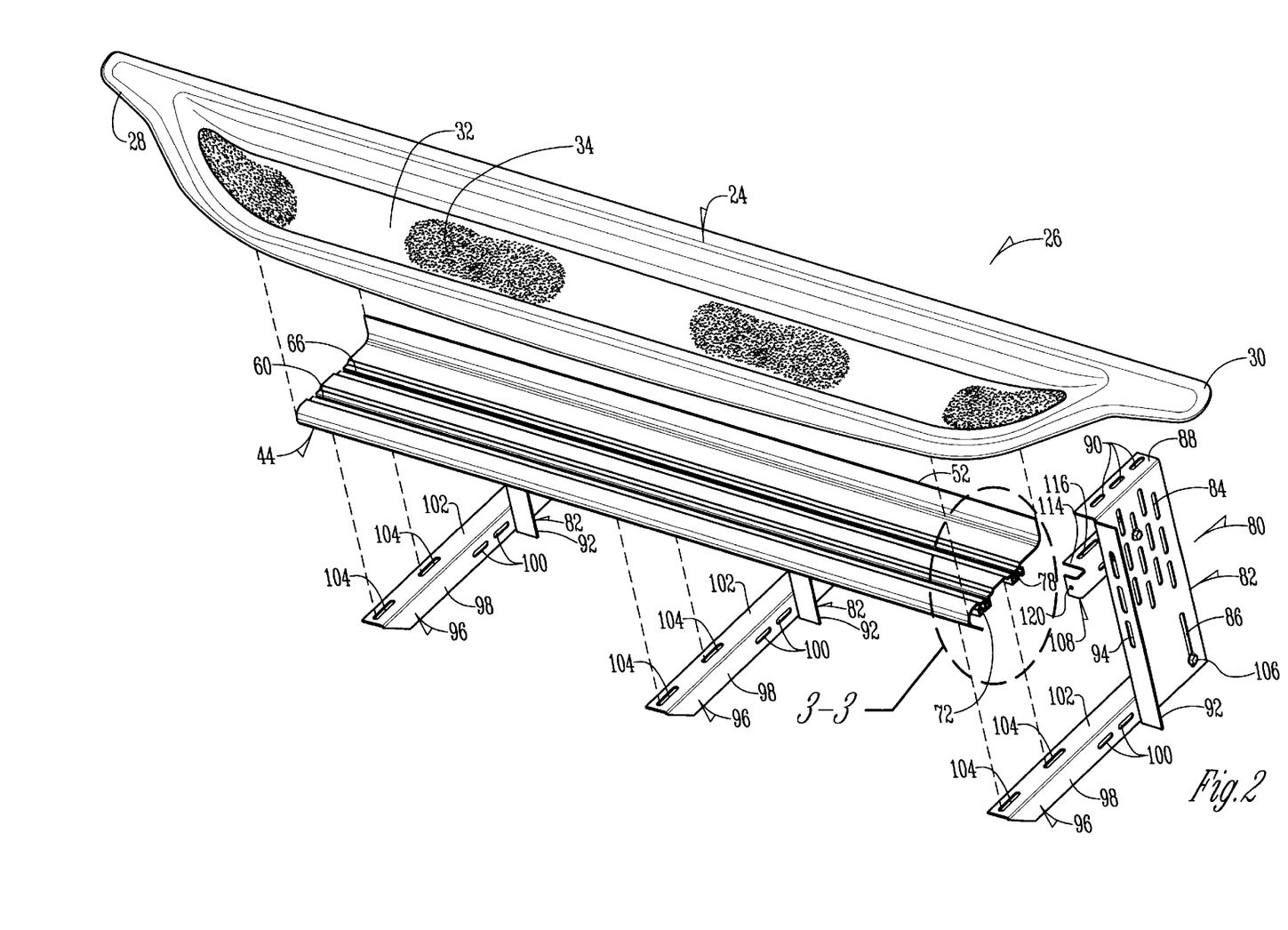
FIG. 2 is an exploded perspective view of the running board assembly.

FIG. 2 shows in more detail the components of the running board assembly 26. The running board 24 is preferably of a one-piece construction being molded or formed of a durable material such as plastic. The elongated running board 24 has a first end 28, a second end 30, and a substantially horizontal support platform 32 therebetween. The running board 24 is substantially symmetrical about its midpoint between the first and second ends (28, 30). As such, the running board 24 is "universal" and can be mounted to either the driver side 12 or passenger side 14 of the vehicle 10. Traction control areas 34 attach to the support platform 32 to prevent slippage during entry and exit from the vehicle.

Figure 4:
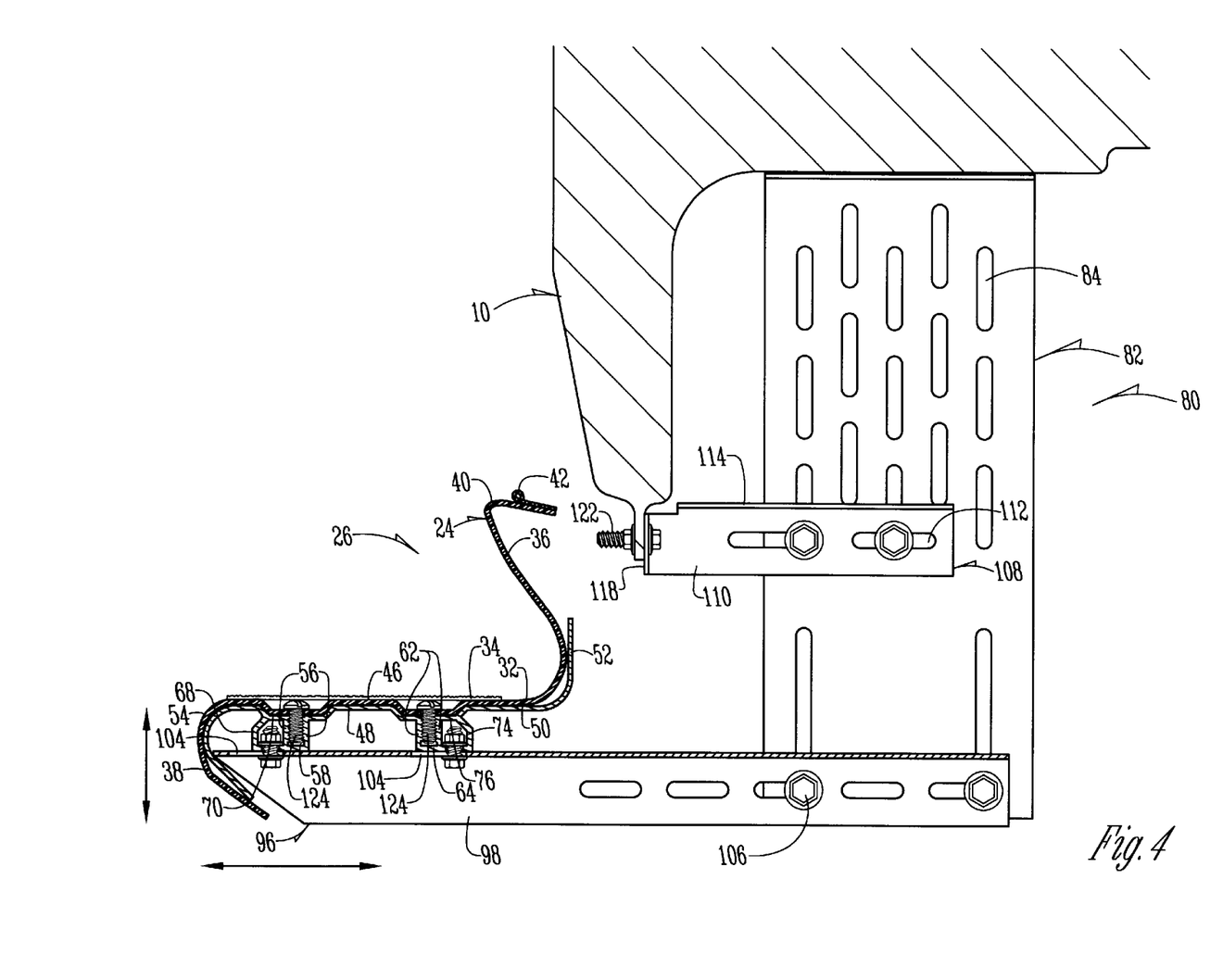
FIG. 4 is a sectional view taken along line 4—4 of FIG. 1.

FIG. 4 shows the curvature of the running board 24 in more detail. An upper arcuate portion 36 extends above the support platform 32 and a lower arcuate portion 38 extends below the support platform 32. A mating surface 40 extends beyond the upper arcuate portion 36 and a flexible sealant 42 positioned on top of the mating surface 40 abuts the vehicle 10 when the running board assembly 26 is fully installed.

Figure 3:
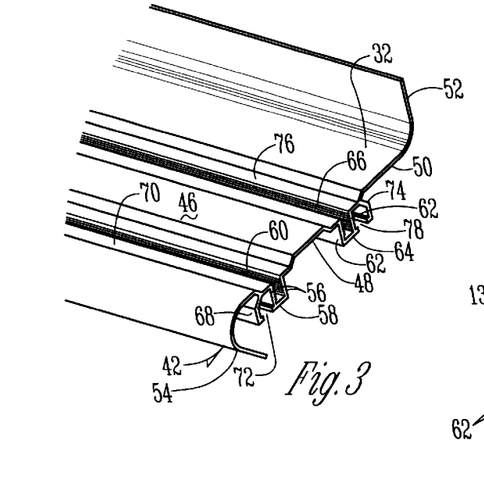
FIG. 3 is a partial perspective view of the reinforcement member.

The running board 24 mounts on top of a reinforcement member 44. The reinforcement member 44 provides support to the running board 24 and also serves as structure for mounting the running board 24 to the vehicle 10. The reinforcement member 44 is preferably made of a strong and light-weight material such as aluminum. As shown in FIG. 3, the reinforcement member 44 has an upper surface 46, a lower surface 48 and a substantially horizontal portion 50. Arcuate edges 52 and 54 follow the contour of the running board 24 to provide additional reinforcement and support. Sidewalls 56 and bottom wall 58 form a first upper channel 60 which is open at the upper surface 46. Similarly, side walls 62 and bottom wall 64 form a second upper channel 66. As will be more fully explained later, the first and second channels 60 and 66 receive fasteners for adjustably mounting the running board 24 on the reinforcement member 44. Because the first and second upper channels 60 and 66 span the entire length of the reinforcement member 44, the running board 24 can be attached at anywhere along its length.

Side walls 56 and 68 and top wall 70 form a first lower channel 72. Similarly, side walls 62 and 74 and top wall 76 form a second lower channel 78. The purpose of the first and second lower channels 72 and 78 is to receive fasteners for adjustably mounting the reinforcement member 44 onto a mounting device.

The reinforcement member 44 is adjustably mounted to the vehicle 10 using a mounting device 80 as shown in FIG. 2. The mounting device 80 has a first mounting member 82 with slots 84 and 86, an upper side edge 88 with slots 90, and a forward side edge 92 with slots 94. Upper side edge 88 and forward side edge 92 are available for receiving fasteners to attach the mounting device 80 to the vehicle 10.

A second mounting member 96 is adjustably attached to and extends substantially horizontal from the first mounting member 80. The second mounting member 96 has a side wall 98 with slots 100 and a top wall 102 with slots 104. Fasteners 106 secure the first and second mounting members 80 and 96 together in a desired position.

A common problem with mounting brackets is that there are gaps or "dead areas" inherent in using a plurality of attachment slots. Prior mounting brackets cannot be adjusted in these dead areas. In the present invention, however, slots 100, 104 and 86 are arranged such that the second mounting member 86 has continuous linear adjustment in a substantially horizontal direction. Slots 104 "cover" the gap between slots 100.

Figure 5:
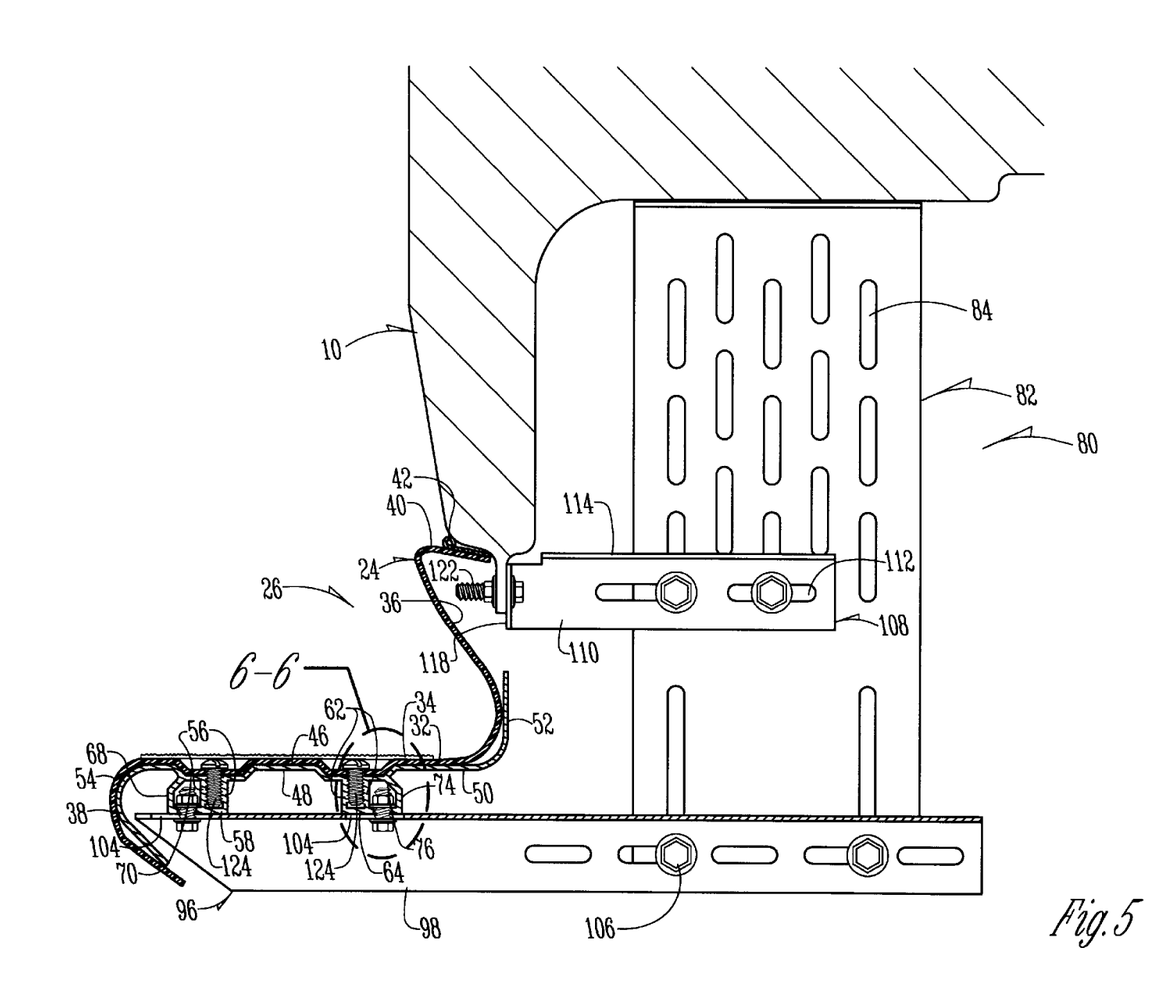
FIG. 5 is a sectional view taken along line 5—5 of FIG. 1.

FIGS. 4 and 5 illustrate how the running board assembly 26 is easily adapted to fit a variety of body styles. Stringer bracket 108 can be attached at various points along the first mounting member 82. The stringer bracket 108 has a first side wall 110 with slots 112 and a second side wall 114 with slots 116 (see FIG. 2). Forward edge 118 of the stringer bracket 108 has a hole 120 for receiving a fastener 122 and attaching to the vehicle 10. The stringer bracket can be easily adjusted into a variety of different positions for mounting to a specific place on the vehicle 10 (see FIGS. 8 and 9).

Figure 6:
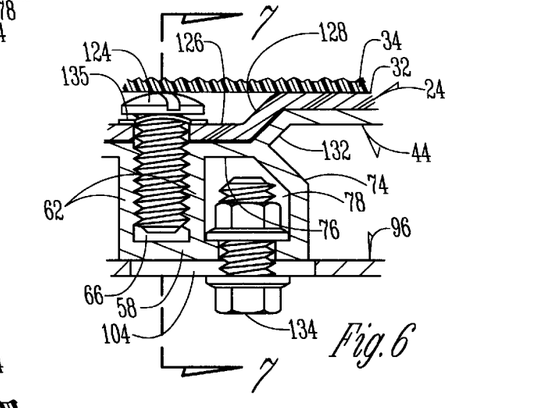
FIG. 6 is a sectional view taken along line 6—6 of FIG. 5.

FIG. 6 is a sectional view showing in more detail the attachment of the running board 24 to the reinforcement member 44 and additionally attachment of the reinforcement member 44 to the second mounting member 96. The second upper and lower channels 66 and 78 are described in detail with the first upper and lower channels 60 and 72 having similar construction. The second upper channel 66 is threaded to receive a screw 124 for adjustably mounting the running board 24 along the channel 66. The screw 124 is recessed at or below the support platform 32 by walls 126 and 128. The reinforcement member 44 is designed to accept the recessed portion of the running board 24 so that walls 126 and 128 abut walls 76 and 132 of the reinforcement member 44, respectively. The screw 124 can be easily adjusted along the second upper channel 66 to adjustably mount the running board 24 to the reinforcement member 44 at any position along the length of the running board 24. The second lower channel 78 is threaded to receive a fastener 134 for adjustably mounting the reinforcement member 44 on the second mounting member 96. Traction control areas enclose the recessed areas.

Figure 7:
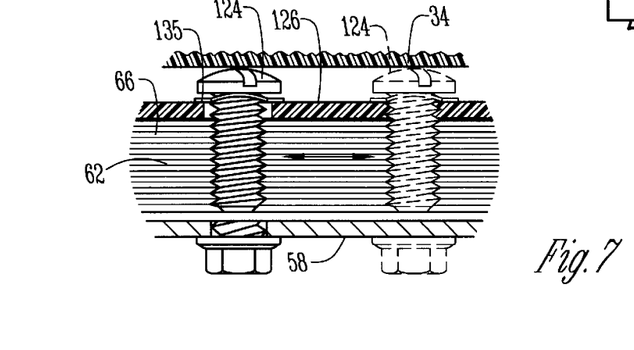
FIG. 7 is a sectional view taken along line 7—7 of FIG. 6 showing expansion and contraction of the running board.

As shown in FIG. 7, a spring washer 135 is used to secure the running board 24 along the first and second upper channels (60, 66). A plastic running board will not always remain fixed, but will expand and contract when subjected to high loads and changes in temperature. The spring washer 135 applies pressure to the running board 24 so that it remains secured while still allowing for slight contractions, expansions, and shifting. Without the spring washer 135, the surface of the running board 24 could crack or warp to relieve structural tension.

Figure 8:
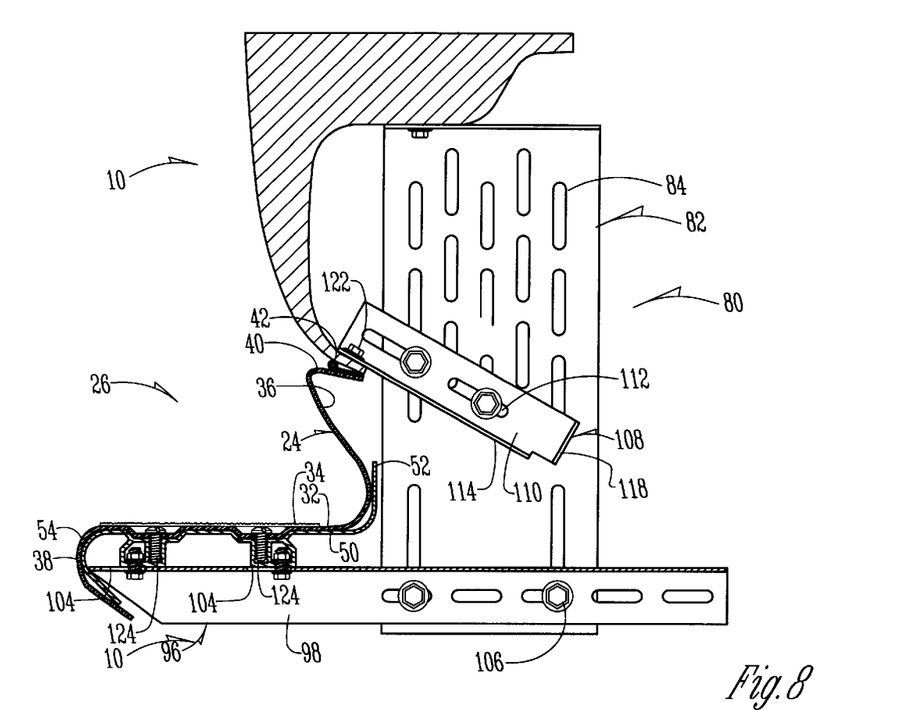
FIG. 8 is a sectional view taken along line 8—8 of FIG. 1 showing an alternative mounting position for the running board.
Figure 9:
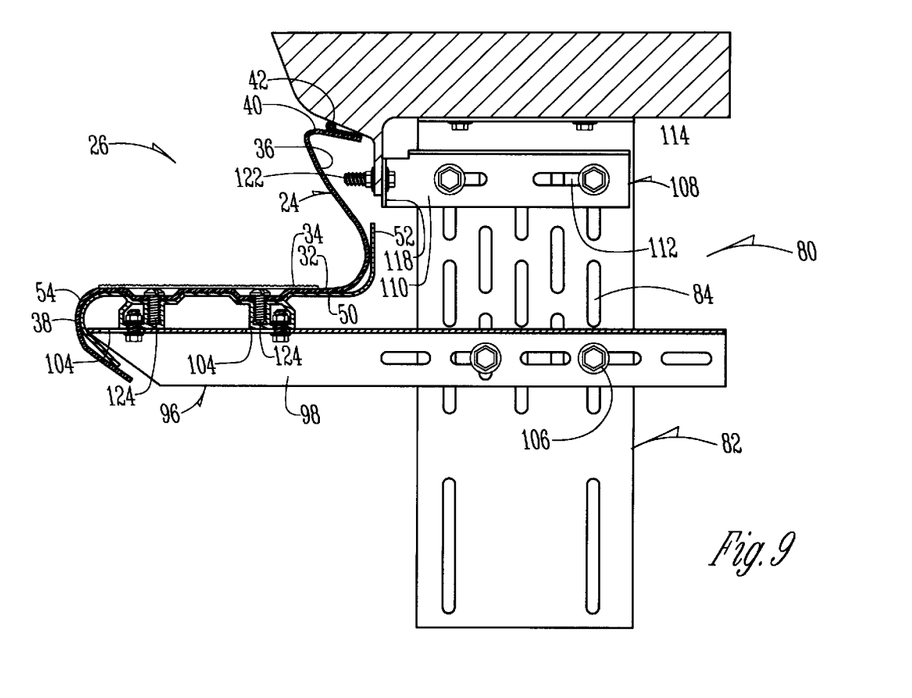
FIG. 9 is a sectional view taken along line 9—9 of FIG. 1 showing a still different mounting position for the running board.

FIGS. 8 and 9 further illustrate how the running board assembly can be easily attached to a variety of different body styles.

Figure 10:
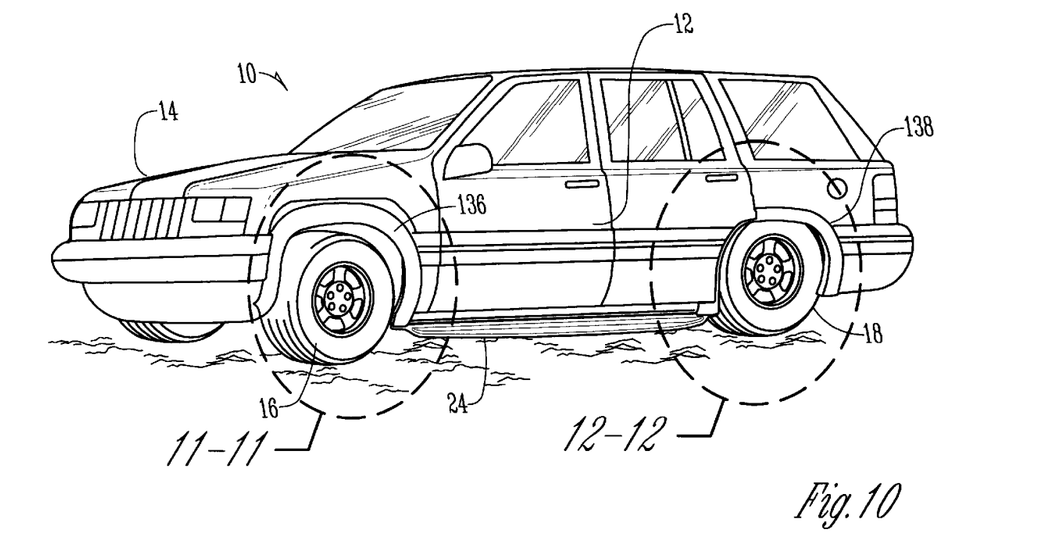
FIG. 10 is a perspective view of a preferred embodiment of the running board and fender flares mounted on a vehicle.
Figure 11:
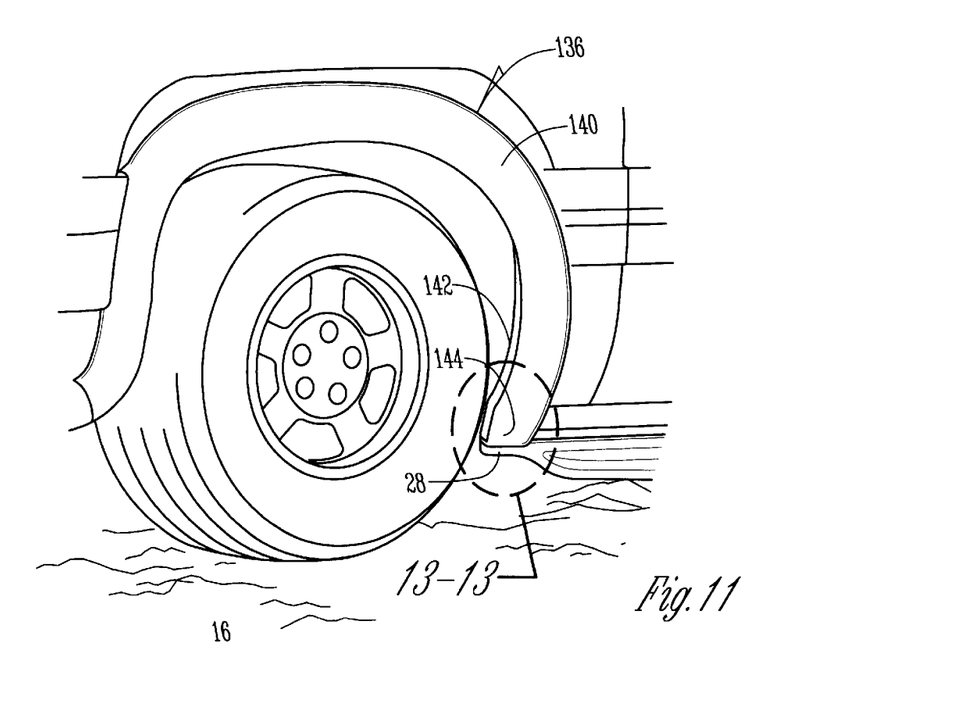
FIG. 11 is an enlarged perspective view of area 11—11 in FIGS. 10 showing the nesting of the fender flare and running board about the forward wheel and fender.
Figure 12:
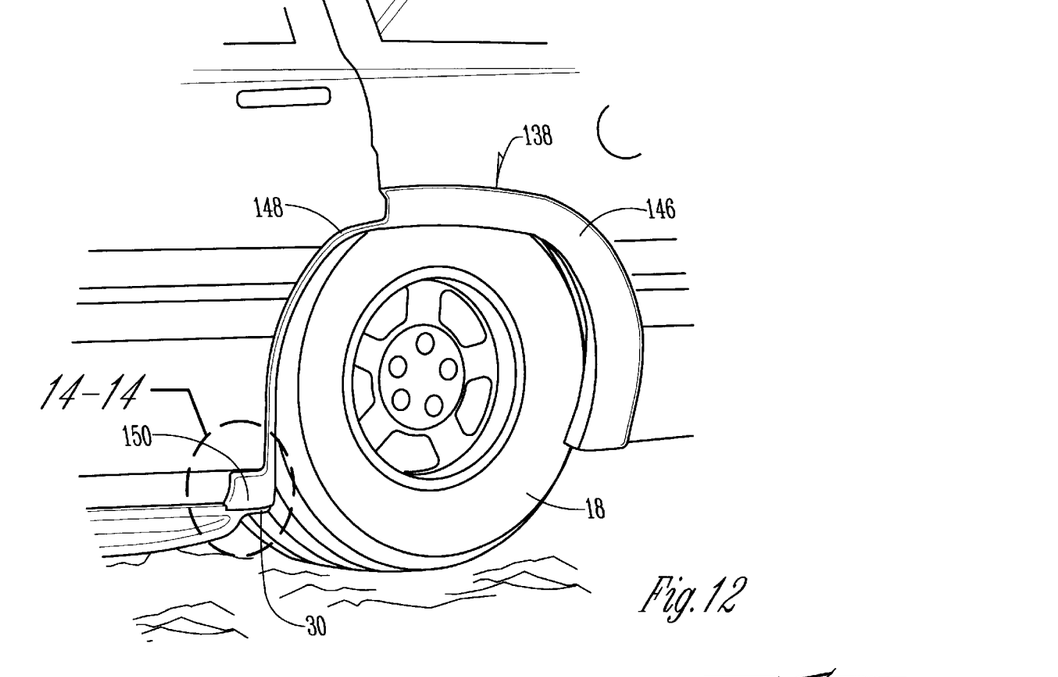
FIG. 12 is an enlarged perspective view of area 12—12 in FIG. 10 showing the nesting of the fender flare and running board about the rearward wheel and fender.

The running board 24 and running board assembly 26 are also intended to be used with forward and rearward fender flares 136 and 138 as shown in FIG. 10. FIG. 11 illustrates the nesting of the forward fender flare 136 and the running board 24. The forward fender flare 136 has a front panel 140 and a side panel 142. The first end 28 of the running board 24 and the lower end 144 of the fender flare 136 are contoured so as to nest together. That is, the lower end 144 of the forward fender flare 136 and the first end 28 of the running board 24 are contoured such that the attachment point is easily located. Furthermore, this nesting gives the appearance that the fender flare 136 and running board 24 are integrally formed, not two separate pieces. The forward fender flare 136 is attached to the forward fender 20 using adhesive or some other fastening means.

Figures 13, 14:
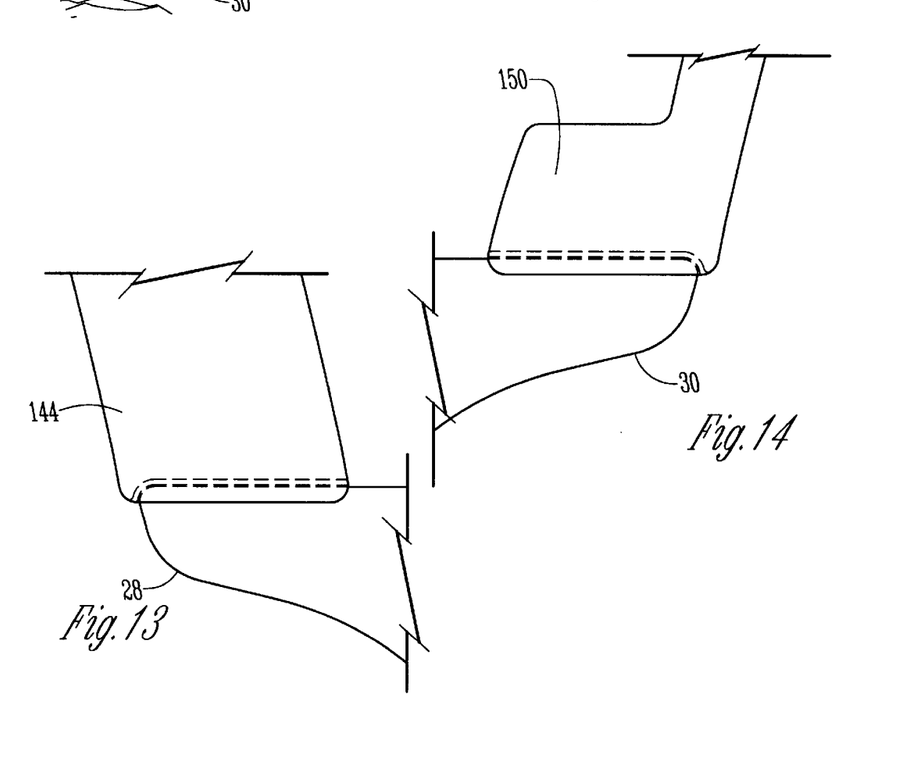
FIG. 13 is an enlarged side elevational view of area 13—13 in FIG. 11 showing with hidden lines the nesting of the forward fender flare and running board.
FIG. 14 is an enlarged side elevational view of area 14—14 in FIG. 2 showing with hidden lines the nesting of the rearward fender flare and running board.

FIG. 13 more clearly illustrates with hidden lines how the inner surface of the lower end 144 of the fender flare 136 is contoured to nest with the outside surface of the first end 28 of the running board 24.

The rearward fender flare 138 is similarly constructed. The rearward fender flare 138 includes a rearward front wall 146, a forward front wall 148 and a forward side wall (not shown). The second end 30 of the running board 24 and the lower end 150 of the rearward fender flare 136 similarly mate and nest together. FIG. 14 shows with hidden lines how the inner surface of the lower end 150 of the rearward fender flare 138 is contoured with the outer surface of the second end 30 of the running board 24 to nest the two accessories together.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A vehicular body extension for attachment to a vehicle having a driver side, a passenger side, and at least one fender, said vehicular body extension comprising:

an elongated running board having a first end, a second end, a midpoint between said first and second ends, and a substantially horizontal support platform between said first and second ends, said support platform being tapered towards both said first and second ends;

said running board being substantially symmetrical about said midpoint so that said running board is attachable to either said driver side or said passenger side.

2. The vehicular body extension of claim 1 further comprising a fender flare mounted to one of the said fenders, said fender flare having a forward end and a rearward end, said rearward end surrounding only a portion of one of said first and second ends of said running board and contoured so that said rearward end and said one of said first and second ends nest and are integrally formed.

3. A running board assembly for use on a vehicle having a driver side and a passenger side, said running board assembly comprising:

an elongated running board having a first end, a second end, and a substantially horizontal support surface between said first and second ends, said support surface having a top side and a bottom side;

an elongated reinforcement member having a top surface, a bottom surface, and a channel open at said top surface, said running board being adjustably mounted about its longitudinal axis to said reinforcement member along said channel with said bottom side of said running board and said top surface of said reinforcement member facing; and a mounting device adjustably mountable to one of said driver and passenger sides of said vehicle, said reinforcement member being adjustably mounted on said mounting device;

said reinforcement member capable of being adjustably mounted to said mounting device at a plurality of points along the longitudinal axis of said reinforcement member;

said channel being adapted for receiving a fastener, said fastener yieldably biasing said running board toward said reinforcement member to allow for expansion and contraction of said reinforcement member.

4. A running board assembly for use on a vehicle having a driver side and a passenger side, said running board assembly comprising:

an elongated running board having a first end, a second end, a midpoint between said first and second ends and a substantially horizontal support surface between said first and second ends, said support surface having a top side and a bottom side and being tapered towards both said first and second ends;

said running board being substantially symmetrical about said midpoint;

an elongated reinforcement member having a top surface and a bottom surface, said running board being adjustably mounted about its longitudinal axis to said reinforcement member with said bottom side of said running board and said top surface of said reinforcement member facing; and a mounting device adjustably mountable to one of said driver and passenger sides of said vehicle, said reinforcement member being adjustably mounted on said mounting device;

said reinforcement member capable of being adjustably mounted to said mounting device at a plurality of points along the longitudinal axis of said reinforcement member.

5. The running board assembly of claim 4 wherein said reinforcement member having a first channel open at said bottom surface, said reinforcement member being adjustably mounted on said mounting device along said first channel.

6. The running board assembly of claim 4 wherein said reinforcement member having a second channel open at said top surface, said running board being adjustably mounted to said reinforcement member along said second channel.

7. The running board assembly of claim 4 wherein said mounting device comprises:

a first mounting member having a plurality of apertures and being attachable to one of said driver and passenger sides of said vehicle;

a second mounting member having a plurality of apertures for attaching to either of said reinforcement member or said first mounting member;

said apertures of said second mounting member and said first mounting member being spaced apart and of sufficient width so that said reinforcement member has continuous linear adjustment extending from said first mounting member.

8. The running board assembly of claim 4 wherein said mounting device comprises:

a first mounting member having a plurality of apertures and being attachable to one of said driver and passenger sides of said vehicle;

a second mounting member having a top wall and a side wall each having a plurality of apertures, said bottom surface of said reinforcement member being adjustably mounted to said top wall using said apertures of said top wall, said apertures of said side wall being selectively aligned with said apertures of said first mounting member for adjustably attaching said first and second mounting members;

said apertures of said side wall, said top wall, and said first mounting member being spaced apart and of sufficient width so that said reinforcement member has continuous linear adjustment extending from said first mounting member.

9. The running board assembly of claim 7 wherein said mounting device further comprises a stringer bracket having a first side wall being adjustably attached to said first mounting member and a second side wall being mounted to one of said driver and passenger sides of said vehicle.

10. The running board assembly of claim 5 wherein said first channel is defined by two parallel side walls and an interconnecting top wall.

11. The running board assembly of claim 10 wherein said reinforcement member has opposite side edges and said first channel is spaced apart from said side edges.

12. The running board assembly of claim 6 wherein said second channel is defined by two parallel side walls and an interconnecting bottom wall.

13. The running board assembly of claim 12 wherein said reinforcement member has opposite side edges and said second channel is spaced apart from said side edges.

14. The running board assembly of claim 4 wherein said running board capable of being adjustably mounted to said reinforcement member about a plurality of points along the longitudinal axis of said running board.

15. The running board assembly of claim 6 wherein said second channel is adapted for receiving a fastener, said fastener yieldably biasing said running board toward said reinforcement member to allow for expansion and contraction of said reinforcement member.

\* \* \* \* \*